US 6,550,777 B2

(12) United States Patent
Turnquist et al.

(10) Patent No.: US 6,550,777 B2
(45) Date of Patent: Apr. 22, 2003

(54) SPLIT PACKING RING SEGMENT FOR A BRUSH SEAL INSERT IN A ROTARY MACHINE

(75) Inventors: Norman Arnold Turnquist, Sloansville, NY (US); Frederick George Baily, Ballston Spa, NY (US); Mark Edward Burnett, Buskirk, NY (US)

(73) Assignee: General Electric Company, Schenectady, NY (US)

( * ) Notice: Subject to any disclaimer, the term of this patent is extended or adjusted under 35 U.S.C. 154(b) by 45 days.

(21) Appl. No.: 09/883,498

(22) Filed: Jun. 19, 2001

(65) Prior Publication Data

US 2002/0190474 A1 Dec. 19, 2002

(51) Int. Cl.$^7$ .................................................. F16J 15/44
(52) U.S. Cl. ........................................ 277/355; 355/412
(58) Field of Search ................................ 277/355, 412, 277/416

(56) References Cited

U.S. PATENT DOCUMENTS

| | | | |
|---|---|---|---|
| 5,114,159 A | * 5/1992 | Baird et al. .................. 277/355 |
| 5,316,318 A | 5/1994 | Veau |
| 5,474,305 A | * 12/1995 | Flower ......................... 277/355 |
| 5,749,584 A | 5/1998 | Skinner et al. |
| 5,941,685 A | 8/1999 | Bagepalli et al. |
| 5,961,125 A | 10/1999 | Wolfe et al. |
| 5,961,280 A | 10/1999 | Turnquist et al. |
| 5,971,400 A | 10/1999 | Turnquist et al. |
| 6,027,121 A | 2/2000 | Cromer et al. |
| 6,030,175 A | 2/2000 | Bagepalli et al. |
| 6,036,437 A | 3/2000 | Wolfe et al. |
| 6,045,134 A | 4/2000 | Turnquist et al. |
| 6,053,699 A | 4/2000 | Turnquist et al. |
| 6,065,754 A | 5/2000 | Cromer et al. |
| 6,079,945 A | 6/2000 | Wolfe et al. |
| 6,105,966 A | 8/2000 | Turnquist et al. |
| 6,105,967 A | 8/2000 | Turnquist et al. |
| 6,116,608 A | 9/2000 | Wolfe et al. |
| 6,131,910 A | 10/2000 | Bagepalli et al. |
| 6,131,911 A | 10/2000 | Cromer et al. |
| 6,139,018 A | 10/2000 | Cromer et al. |
| 6,139,019 A | 10/2000 | Dinc et al. |
| 6,161,836 A | * 12/2000 | Zhou ........................... 277/355 |
| 6,168,162 B1 | 1/2001 | Reluzco et al. |
| 6,168,377 B1 | 1/2001 | Wolfe et al. |
| 6,206,629 B1 | 3/2001 | Reluzco et al. |
| 6,250,640 B1 | 6/2001 | Wolfe et al. |
| 6,250,641 B1 | 6/2001 | Dinc et al. |
| 6,257,586 B1 | 7/2001 | Skinner et al. |
| 6,260,269 B1 | 7/2001 | Turnquist et al. |
| 6,261,057 B1 | 7/2001 | Turnquist et al. |

FOREIGN PATENT DOCUMENTS

| | | |
|---|---|---|
| GB | 2 301 635 A | 12/1996 |
| WO | WO 92/05378 | 4/1992 |

* cited by examiner

Primary Examiner—Anthony Knight
Assistant Examiner—Michael W White
(74) Attorney, Agent, or Firm—Nixon & Vanderhye

(57) ABSTRACT

A plurality of packing ring segments are provided in a stationary component and about a rotating shaft. Each packing ring segment includes a brush seal insert and a plurality of labyrinth seal teeth along a concave sealing face thereof. Each segment is formed of a pair of components which, in assembly, have a split line through a slot receiving the brush seal insert. The brush seal insert includes a pair of narrow strips or rods welded to outer ends of the bristle pack and is bendable to a range of diameters. By forming forward and backing surfaces defining the slot integral with the components, the width of the bristle slot and the gap between the bristle pack and the forward surface can be readily manufactured and obtained.

14 Claims, 5 Drawing Sheets

SPLIT PACKING RING SEGMENT FOR A BRUSH SEAL INSERT IN A ROTARY MACHINE

BACKGROUND OF THE INVENTION

The present invention relates to combination brush and labyrinth seals for a rotary machine such as steam and gas turbines and particularly to split packing ring segments for receiving low-cost bendable brush seal inserts.

Rotary machines such as steam and gas turbines used for power generation and mechanical drive applications are generally large machines consisting of multiple turbine stages. High pressure fluid flows through the stages and must pass through a series of adjoining stationary and rotating components and seals therebetween. Seals between the stationary and rotating components are used to control leakage. Labyrinth-type seals are typically used in machines of this type and conventionally comprise labyrinth teeth spaced axially one from the other for controlling leakage between the rotating and stationary components. Examples of labyrinth seal usage includes interstage shaft seals, rotor end seals and blade tip seals.

More recently, brush seals have been employed in conjunction with packing ring segments and labyrinth seal teeth. Typically, a brush seal is installed in a groove or cell machined in a solid packing ring segment having one or more labyrinth teeth spaced axially from the tips of the bristles projecting from the concave surface of the packing ring segment. The brush seal normally consists of three components joined preferably by welding. These components include a forward plate, a backing plate and bristle pack disposed between the forward and backing plates. The brush seal, however, is a complex and costly component. It must be machined to precisely fit the diameter of the rotor against which it will bear as a seal. Because of the large number of rotor sizes, brush seals cannot be advance-ordered for retention in inventory but must be custom manufactured for each application, requiring extended cycle times. On the other hand, brush seals are very desirable. For example, brush seals have the ability to accommodate radial excursions of a rotor. They typically have the ability to closely control the gap between the forward plate and the bristle pack. The total width of the gap and the bristle pack is preferably on the order of 0.1 to 0.2 inches. A typical example of a combined labyrinth and brush seal for a rotary machine is described and illustrated in U.S. Pat. No. 6,105,967, of common assignee herewith. It is therefore desirable to provide a labyrinth/brush seal combination in a packing ring segment wherein a brush seal is adaptable to different diameters, producible at low cost and readily applied in the packing ring segment.

BRIEF SUMMARY OF THE INVENTION

In accordance with a preferred embodiment of the present invention, there is provided a packing ring comprised of a plurality of packing ring segments each having a concave surface about an axis mounting one or more labyrinth seal teeth projecting from the surface. A chamber or cell is provided in the concave surface for reception of a brush seal insert. Each packing ring segment, however, is formed of two components secured one to the other by fasteners. The first component has a first surface which forms a backing plate for the bristles of the brush seal in the chamber. The second component has a second surface forming a forward surface in spaced opposition to the array of bristles forming the brush seal in the chamber. Thus, the brush seal forward and backing surfaces are integrally formed as part of the packing ring segment components. It will be appreciated that a generally T-shaped slot is formed in the packing ring segment to define the chamber, the base of the slot serving to retain the base of the brush seal insert in the slot. However, substantial width between the first and second surfaces has been needed in integral packing ring segments in order for a cutting tool to enter the bristle slot and machine the base of the T-slot into the packing ring segment, as well as the pressure balance grooves in the inner face of the backing plate. As a result, a fairly wide slot is necessarily formed. This has heretofore precluded the surface of the slot from forming the surface of the forward plate. That is, the wide slot prevents the forward surface from offering the same protection to the bristles as a narrow gap between the bristles and a forward plate would otherwise offer in conventional brush seals.

Also in accordance with a preferred embodiment hereof, the brush seal insert includes two very narrow strips along both sides of the weld at the top of the bristle pack. By using narrow strips, the brush seal can be readily bent over a significant range of diameters. Consequently, the brush seal insert can be provided in inventory in several standard diameter sizes and bent to the specific diameters needed within predetermined ranges. In order to accommodate the machining necessary to provide the base of the T-slot in each segment, as well as the pressure balance grooves, one aspect of the present invention provides for a packing ring segment formed of two components. A first component has a first surface which forms the backing plate for the bristles of the brush seal. The second component has a surface which forms the forward plate of the brush seal and is spaced in assembly from the bristle pack by a narrow gap. Thus, all of the machining required can be accomplished in each of the packing ring segment components prior to their assembly with the brush seal insert between the components in the brush seal chamber.

In one preferred embodiment of the present invention, the components are split along a plane normal to the rotary axis and passing through the chamber for the brush seal insert or one of the surfaces forming the forward or backing plate for the brush seal bristle pack. Thus, the bristle chamber can be formed to the required dimensions and the backing plate pressure balance grooves can be readily machined in the components. In a second embodiment, the packing ring segment is split from its concave sealing surface to the hook on its upstream side and along an arcuate surface radially inwardly of the hook toward the upstream side. Thus, the hook of the other component remains unbroken. The two components may be secured together by fasteners, such as threaded fasteners, bolts or the like.

In a preferred embodiment according to the present invention, there is provided a packing ring seal about a rotatable component comprising an arcuate packing ring segment for forming a portion of the packing ring seal and having a concave sealing surface, the segment including first and second discrete arcuate components in axial face-to-face relation to one another and secured to one another, the first and second components having first and second surfaces along respective faces thereof and axially spaced from one another defining a slot opening through the concave surface of the arcuate segment, an arcuate brush seal insert having an arcuate array of bristles disposed between the first and second surfaces and having bristle tips projecting from the segment along the concave surface thereof and at least one labyrinth seal tooth extending from the concave surface of the segment in spaced axial relation to the brush seal.

In a further preferred embodiment according to the present invention, there is provided for use in a machine having a component rotatable about an axis, a stationary component about the axis having an annular recess and at least one axially extending support carried by the stationary component about the axis and projecting into the recess, a packing ring comprising a plurality of packing ring segments for positioning about the axis, the segment having an arcuate seal face in opposition to the rotatable component and at least a first arcuate flange extending in an axial direction for cooperation with the one support to retain a portion of the packing ring segment in the recess, a generally T-shaped arcuate slot in the segment having an axially enlarged base and opening in a generally radial direction away from the base and toward the axis defining first and second axially opposed and spaced surfaces of the slot, a brush seal insert having a base element and a plurality of bristles extending from the base securing the bristles in the insert, the brush seal insert being disposed in the T-shaped slot with the base element received in the enlarged base of the slot and the bristles extending between the first and second axially spaced surfaces with the bristles abutting the first surface of the slot and spaced from the second surface thereof, the packing ring segment being split into a first component including the first surface and a second component including the second surface and means for securing the first and second components together with the brush seal bristles between the surfaces.

DETAILED DESCRIPTION OF THE INVENTION

Figure 1:
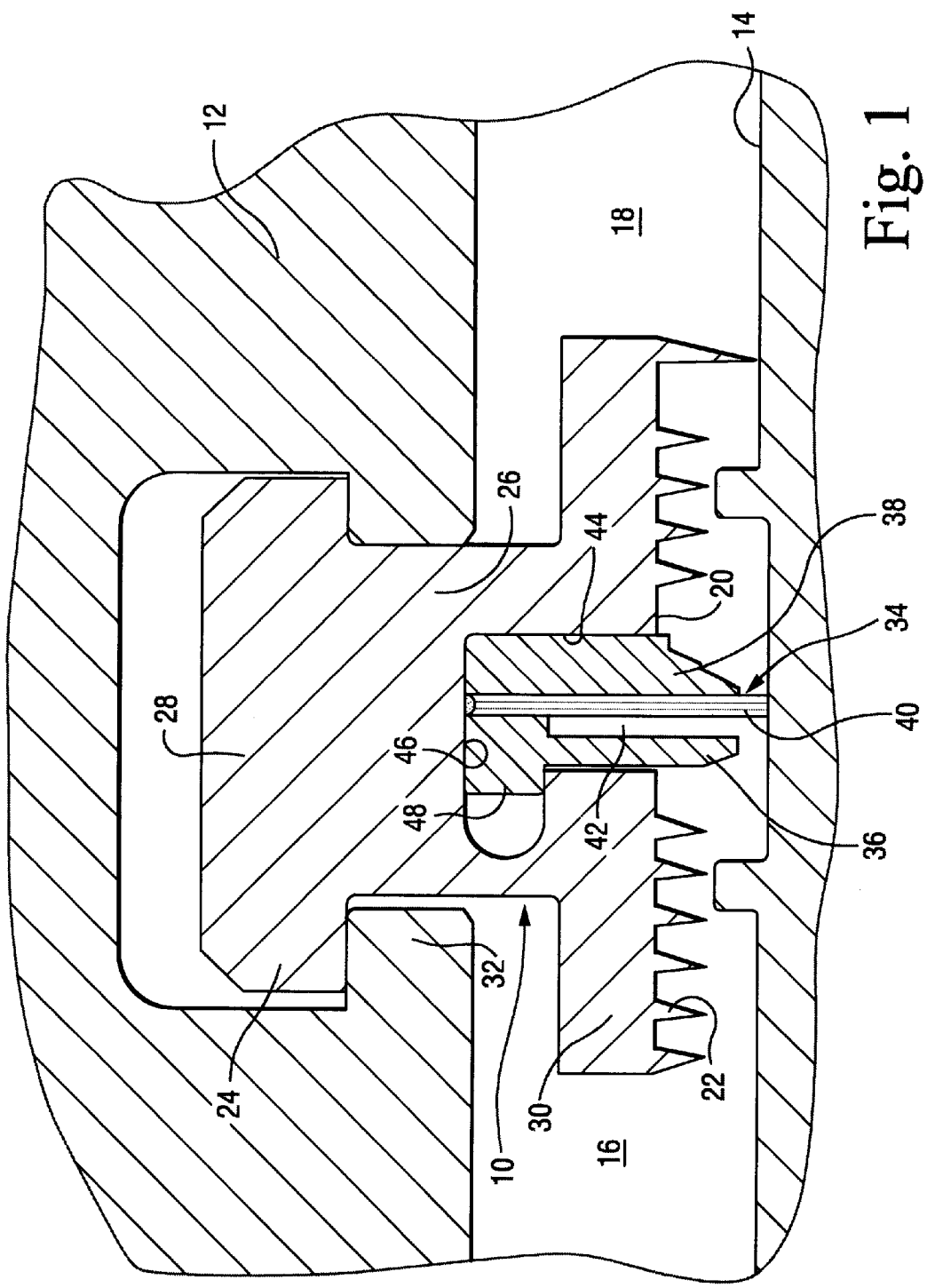
FIG. 1 is a schematic illustration of a packing ring segment between stationary and rotary components illustrating a combined labyrinth and brush seal according to the prior art.

Referring now to FIG. 1, there is illustrated a packing ring segment, generally designated 10, constructed in accordance with the prior art. The packing ring segment 10 is illustrated as forming a part of a stationary component 12 of a rotary machine, for example, a steam or gas turbine, having a rotatable shaft 14. It will be appreciated that a packing ring comprised of a plurality of packing ring segments 10 separate high and low pressure regions on axially opposite sides of the ring, the high pressure region being denoted at 16 and the low pressure region being denoted at 18. Each packing ring segment 10 includes an arcuate, i.e., concave sealing face 20, having one or more labyrinth seal teeth 22 axially spaced one from the other in opposition to the surface of the rotary member 14. In the illustrated prior art segment, the segment includes a pair of flanges 24 extending axially beyond a neck portion 26 of the segment interconnecting the base 28 of the segment and the sealing portion 30. The stationary component 12 includes a pair of hooks 32 for engagement by the axial flanges 24, retaining the segment in the stationary component 12.

As illustrated, the packing ring segment 10 also includes a brush seal, generally designated 34. The brush seal includes a forward plate 36, a backing plate 38 and an annular array of a plurality of brush bristles 40 which may be metallic or ceramic. As illustrated, the bristles project from the packing ring segment for engagement with the surface of the rotary component 14 to effect a seal. Note that a gap 42 extends between the forward plate 36 and the bristle pack 40. Also, the brush seal is received within a channel 44 formed through the seal face 20 of the seal segment, terminating in an enlarged base 46 for reception of an axially extending flange 48 on the forward plate as shown, or on the backing plate 38 to facilitate retention of the brush seal in the brush seal channel 44. As previously indicated, the brush seals of the type illustrated are complex and costly to manufacture. Further, in order to form the base 46 and the pressure balance grooves, not shown, it is necessary to form a brush seal chamber having substantial width. Also, because the forward and backing plates 36 and 38 are formed of substantial and non-bendable material, they must be formed for each diameter in which the seal is intended for use and there is no interchangeability with respect to smaller or larger diameter seals.

Figure 2:
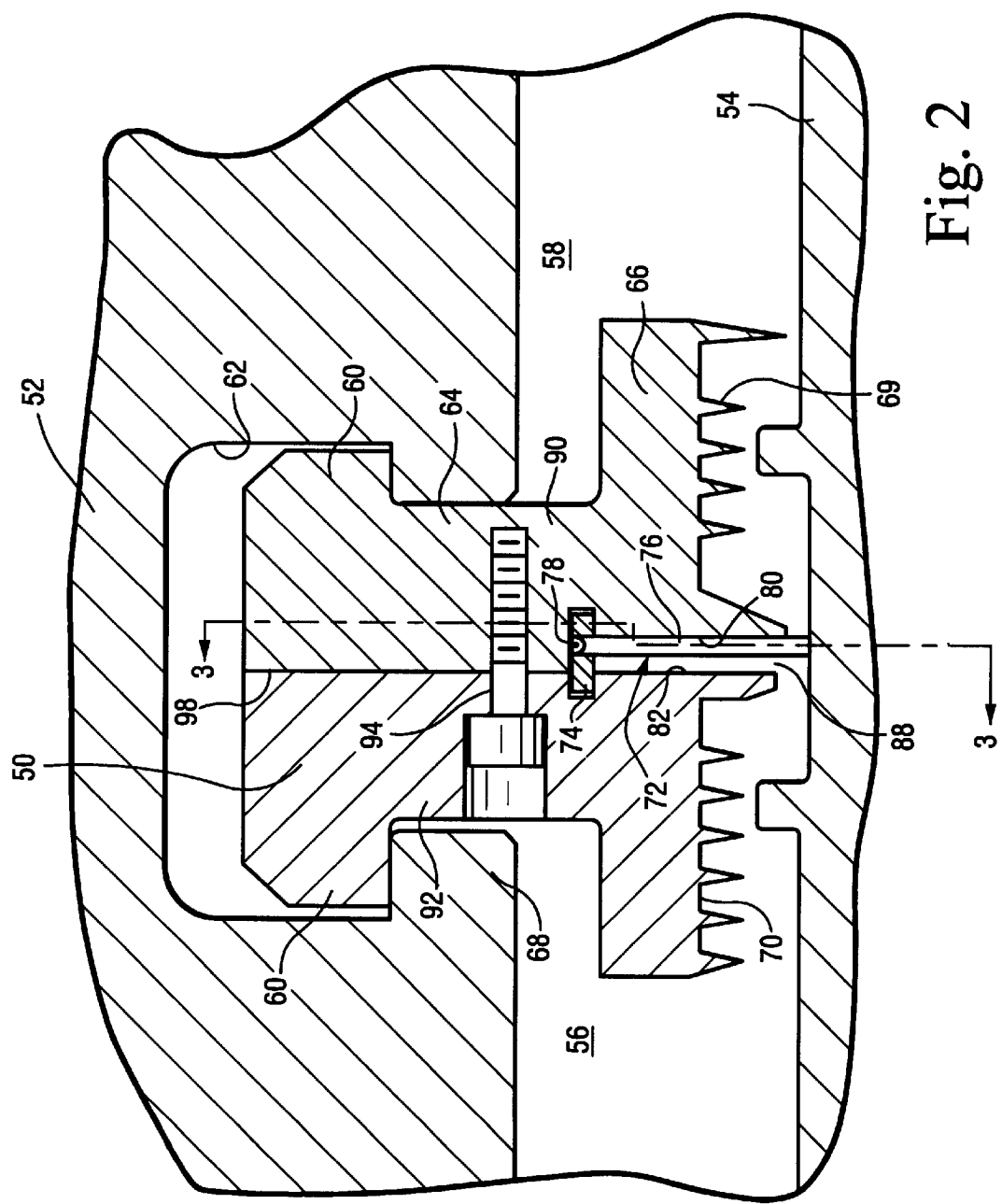
FIG. 2 is a schematic illustration of a packing ring segment with combined brush and labyrinth seals in accordance with a preferred embodiment of the present invention.

In order to reduce the costs of the packing ring segments with labyrinth/brush seals, and to accommodate standard sizes of brush seal inserts for use with different rotary diameters, the present invention provides a brush seal insert and packing ring segment combination having various novel aspects. Referring now to FIG. 2, there is illustrated a packing ring segment 50 constructed in accordance with a preferred embodiment of the present invention extending between a stationary component 52 of turbomachinery and a rotary component 54, i.e., a shaft. The packing ring segment 50 seals between high and low pressure regions 56 and 58, respectively, on opposite sides of the segment. It will be appreciated that the segment 50 is arcuate and that a plurality of such segments are arranged in end-to-end relation about the stationary and rotary components to form a seal between the high and low pressure regions. A pair of such segments 50 are illustrated in FIG. 2 in end-to-end relation to one another. The segment 50 includes axially extending locating flanges 60 in a dovetail-shaped groove 62 of stationary component 52. An axially reduced neck 64 interconnects between the locating flanges 60 and seal flanges 66. The neck 64 extends between supports or hooks 68 in the stationary component and in part define the dovetail slot 62. Various arrangements, not shown, may be provided for biasing the packing ring segments for movement in radial directions. For example, see U.S. Pat. No. 6,065,754.

The sealing flanges 66 include a plurality of labyrinth teeth 69 axially spaced from one another. It will be appreciated that the sealing flange 66 has an arcuate sealing face 70 from which the teeth 69 project in a generally radially inward direction.

Figure 3:
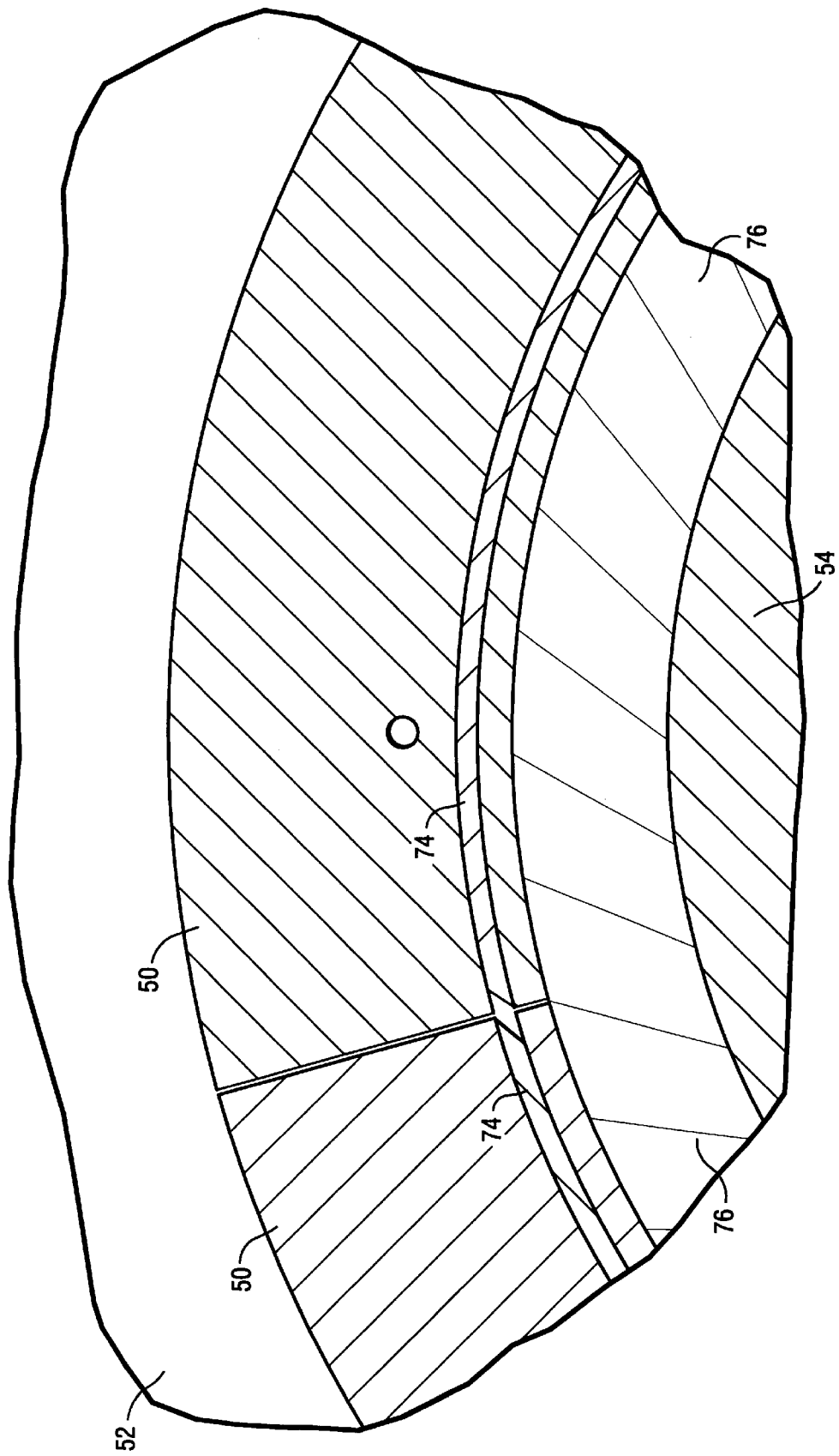
FIG. 3 is a cross-sectional view thereof taken generally about on line 3—3 in FIG. 2 and illustrating a pair of packing ring segments arranged in circumferential end-to-end relation.
Figure 4:
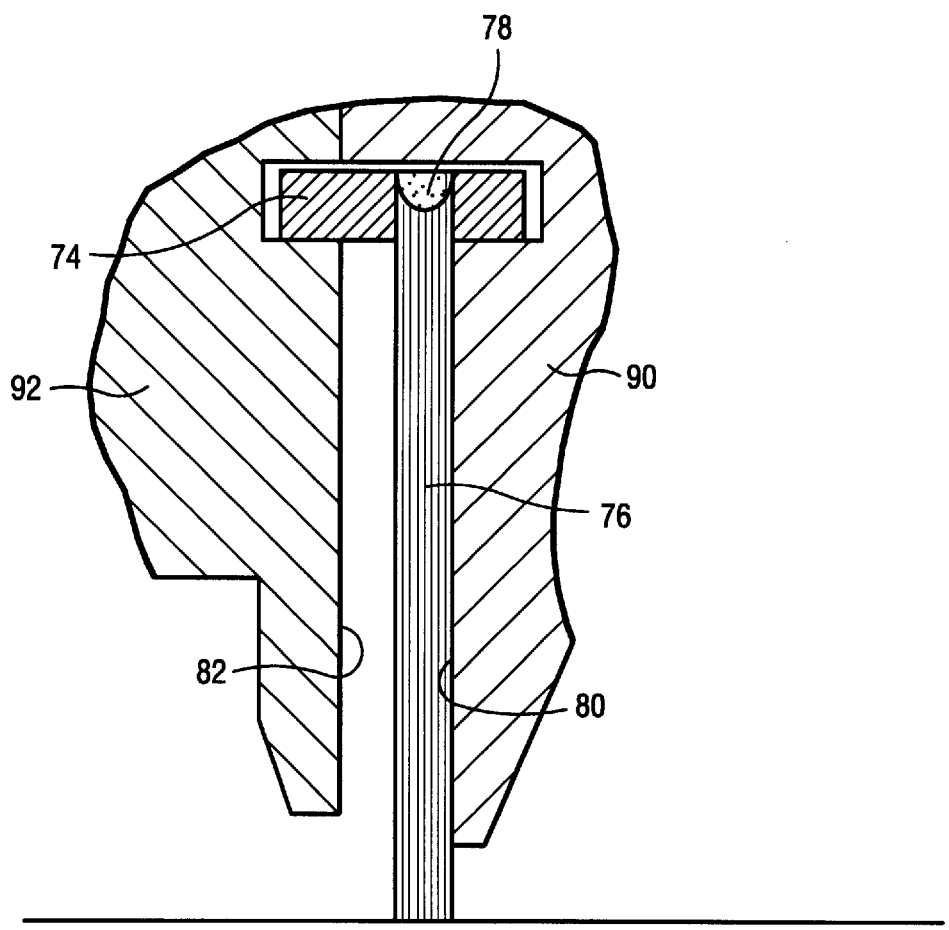
FIG. 4 is an enlarged cross-sectional view of a brush seal insert of an embodiment hereof illustrated in FIG. 2.

Disposed generally centrally of the packing ring segment is a brush seal insert, generally designated 72. For example, as illustrated in FIG. 4, the brush seal insert includes a base element preferably comprised of a pair of strips or bars 74 on opposite sides of the radial outer ends of brush bristles 76. The strips 74 and outer ends of the bristles 76 are welded to one another, the weld being illustrated at 78. It will be appreciated, from a review of FIG. 3, that the bristles 76 are canted relative to radii of the shaft 54 and form a cant angle therewith to accommodate the relative movement between the shaft 54 and stationary component 52. The brush seal insert 72 is configured for bending about an axis within a significant range of diameters. That is, because of the severely reduced radius of each of the strips 74 in comparison with the front and backing plates 36 and 38 of the prior art, the brush seal insert is enabled for bending to various diameters in a range of diameters. Accordingly, the brush seal insert can be fabricated in advance and inventoried in several standard diameters for use in a large range of brush seal diameters.

To accommodate each brush seal insert 72, each packing ring segment 50 is provided with first and second surfaces 80 and 82 serving as backing and forward plate surfaces, respectively. The surfaces 80 and 82 are integrally formed with the packing ring segment 50 as illustrated in FIG. 2. In order to accommodate the narrow width of the generally T-shaped chamber or slot 88 (FIG. 2) in which the brush seal insert resides, and also to afford protection to the bristles by the forward surface 82 while affording a backing surface 80, the packing ring segment 50 is split into two components 90 and 92. In a preferred embodiment of the present invention as illustrated in FIG. 2, the component 90 and component 92 form generally axially opposite halves of the packing ring segment, the split line 98 lying generally in a plane normal to the axis and passing through the chamber receiving the brush seal insert 72 or one of the surfaces 80 and 82. By providing the packing ring segment in two components 90 and 92, the bristle chamber can be formed to the required dimensions and local details such as backing plate pressure balance grooves can be readily machined into the components. Means are provided for securing the first and second components to one another. For example, such means may comprise fastening elements, such as threaded fasteners 94 or rivets, at circumferentially spaced locations about the segments.

Figure 5:
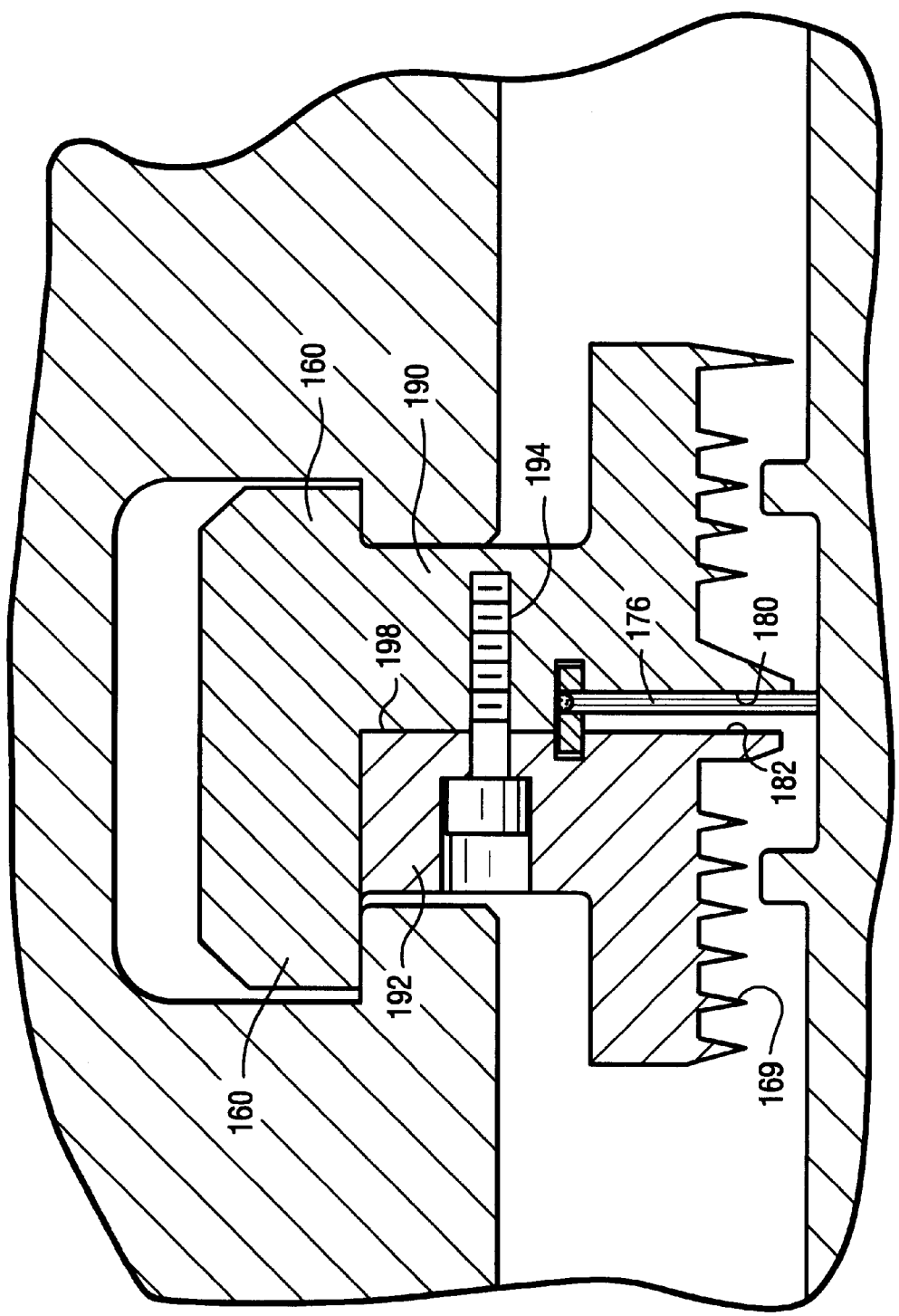
FIG. 5 is a view similar to FIG. 2 illustrating a further preferred embodiment of the present invention.

In the embodiment hereof illustrated in FIG. 5, like reference numerals are applied to like parts as in the prior embodiment, preceded by the numeral 1. The packing ring segment 150 has two components 190 and 192. The central split line 198, however, terminates short of the axial flanges 160 of the segment and extends axially toward the upstream side generally parallel to the radial surface of the upstream flange 160. Threaded fasteners 194 are preferably employed at circumferentially spaced locations along the length of the segment to secure the components 190 and 192 to one another. Note that the screw heads of the fasteners 94 and 194 in both embodiments are located on the side away from the steam joint and that the threaded openings do not penetrate to the steam joint on the downstream side. Also, the components may be positioned using dowels, rivets or a rabbeted fit as desired.

In both of the illustrated embodiments of the present invention, it will be appreciated that a variety of packing ring segments employing combined labyrinth/brush seals may be provided at lower cost while maintaining the performance and reliability of standard brush seals. By splitting the segments into axially contiguous components, the necessary machining to provide the surfaces 80, 82, 180 and 182, the T-slot or base, as well as the pressure balance grooves, not shown, may be radially performed on the separate parts. The gap between the bristle pack and the forward face may be dimensional as tight as necessary or desirable.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A packing ring seal for a component that rotates about an axis, comprising:

an arcuate packing ring segment having a concave sealing surface, said segment forming a portion of said packing ring seal and including first and second discrete arcuate components in axial face-to-face relation to one another and secured to one another, said first and second components having first and second surfaces along respective said faces thereof, said first and second surfaces defining a slot opening through said sealing surface, said slot opening including an axially extending groove in each of said components; and an arcuate brush seal insert having an arcuate array of bristles disposed between said first and second surfaces, said bristles having tips projecting from said segment along said sealing surface, said brush seal insert including a pair of support strips straddling radial outer ends of the brush seal bristles and at least in part disposed in respective grooves.

2. A packing ring seal according to claim 1 wherein said first and second components engage one another along a plane normal to said axis, said plan passing through one of said surfaces or said slot opening between said surfaces.

3. A packing ring seal according to claim 1, wherein said brush seal insert includes a weld securing said support strips and said bristles to one another.

4. A packing ring seal according to claim 1 wherein at least one labyrinth seal tooth extends from said sealing surface of said segment in spaced axial relation to said brush seal insert.

5. For use in a machine having a component rotatable about an axis, a packing ring comprising:

a plurality of packing ring segments for positioning about said axis, each said segment having an arcuate seal face in opposition to the rotatable component and at least a first arcuate flange extending in an axial direction for cooperation with a support in the machine to retain said segment, each said segment including a first component having a first surface and a second component having a second surface;

a generally T-shaped arcuate slot in said segment, said slot having an axially enlarged base and opening in a generally radial direction away from said base and toward said axis, said slot defined by said first and second surfaces, said first and second surfaces being axially opposed and spaced apart;

a brush seal insert having a base element and a plurality of bristles extending from said base element, said base element securing the bristles in said insert, said insert disposed in said T-shaped slot with said base element received in said axially enlarged base, said bristles extending between said first and second surfaces, said bristles abutting said first surface and spaced apart from said second surface; and means for securing said first and second components together, with said bristles between said first and second surfaces.

6. A packing ring according to claim 5 wherein said securing means includes fasteners extending between said components at circumferentially spaced locations about said segment.

7. A packing ring according to claim 5 wherein said securing means includes threaded fasteners for securing said first and second components to one another.

8. A packing ring according to claim 5 wherein said first component carries said arcuate flange.

9. A packing ring according to claim 5 wherein said second component carries said arcuate flange.

10. A packing ring according to claim 5 wherein said arcuate seal face includes at least one circumferentially extending labyrinth seal tooth spaced axially from said brush seal insert.

11. A packing ring according to claim 5 wherein said first and second components engage one another along a plane normal to the axis and passing through one of said surfaces or the space between said surfaces.

12. A packing ring according to claim 5 wherein said first component includes a second arcuate flange extending in a direction opposite the first arcuate flange, said second component having a radial extent less than a radial extent of said first component.

13. A packing ring according to claim 5 wherein said base element of said brush seal insert includes a pair of support strips straddling radial outer ends of the brush seal bristles and a weld securing said strips and said bristles to one another.

14. A packing ring according to claim 5 wherein said securing means includes rivets for securing said first and second components to one another.

* * * * *